US005569553A

United States Patent [19]
Smesko et al.

[11] Patent Number: 5,569,553
[45] Date of Patent: Oct. 29, 1996

[54] BATTERY DESIGN FOR ACHIEVING END-OF-LIFE INDICATION DURING ELECTRICAL DISCHARGE

[75] Inventors: Sally A. Smesko, North Tonawanda; Esther S. Takeuchi, East Amherst; Steven J. Ebel, Clarence, all of N.Y.

[73] Assignee: Wilson Greatbatch Ltd., Clarence, N.Y.

[21] Appl. No.: 400,975

[22] Filed: Mar. 8, 1995

[51] Int. Cl.⁶ ................................................. H01M 10/48
[52] U.S. Cl. .............................. 429/90; 429/94; 429/217; 429/232
[58] Field of Search .................... 429/90–93, 94, 429/217, 232; 320/39, 43, 48

[56] References Cited

U.S. PATENT DOCUMENTS

| | | |
|---|---|---|
| 922,726 | 5/1909 | Schoenmehl . |
| 1,138,363 | 5/1915 | Elmes . |
| 1,450,059 | 3/1923 | Becker . |
| 1,530,699 | 3/1925 | Ross et al. . |
| 2,189,463 | 2/1940 | Eddy ................................ 136/125 |
| 2,942,052 | 6/1960 | Bourke et al. ........................ 136/6 |
| 4,025,700 | 5/1977 | Fagan, Jr. et al. ................... 429/91 |
| 4,060,666 | 11/1977 | Anes ................................. 429/91 |
| 4,126,735 | 11/1878 | Fritts ............................... 429/91 |
| 4,132,836 | 1/1976 | Greatbatch ........................... 429/91 |
| 4,144,382 | 3/1979 | Takeda et al. ........................ 429/91 |
| 4,247,606 | 1/1981 | Uetani et al. ........................ 429/91 |
| 4,259,415 | 3/1981 | Tamura et al. ........................ 429/90 |
| 4,293,622 | 10/1981 | Marincic et al. ..................... 429/50 |
| 4,310,609 | 1/1982 | Liang et al. ....................... 429/194 |
| 4,376,810 | 3/1983 | Takeda et al. ....................... 429/90 |
| 4,388,380 | 6/1983 | DeHaan et al. ....................... 429/91 |
| 4,399,202 | 8/1983 | Ikeda et al. ........................ 429/91 |
| 4,403,020 | 8/1983 | Dampier ............................. 429/91 |
| 4,416,957 | 11/1983 | Goebel et al. ....................... 429/91 |
| 4,418,129 | 11/1983 | Goebel ............................. 429/91 |
| 4,543,304 | 8/1985 | DeHaan ............................. 429/91 |
| 4,563,401 | 1/1986 | Kane et al. ......................... 429/91 |
| 4,619,874 | 10/1986 | Skarstad et al. ..................... 429/91 |
| 4,830,940 | 5/1989 | Keister et al. ..................... 429/194 |
| 5,028,500 | 7/1991 | Fong et al. ....................... 429/194 |

*Primary Examiner*—Anthony Skapars
*Attorney, Agent, or Firm*—Hodgson, Russ, Andrews, Woods & Goodyear LLP

[57] ABSTRACT

A cell construction that makes use of unbalanced electrode components or portions comprising one of the electrodes of an electrochemical cell to provide an end-of-life indication, is described. The unbalanced electrode components can have dissimilar physical dimensions or dissimilar percent loading of electrode active material. This renders the one dissimilar electrode component having the lesser physical dimension, i.e., lesser surface area or thickness, or lesser quantity of electrode active material electrochemically unreactive prior to the other electrode component during the course of cell discharge. Upon the early exhaustion or unreactiveness of the one dissimilar electrode component, the total cell interelectrode working capacity is reduced by a predetermined factor. The remaining functional electrode component provides the cell with sufficient capacity for electrical discharge at a predetermined lower energy level.

45 Claims, 8 Drawing Sheets

BATTERY DESIGN FOR ACHIEVING END-OF-LIFE INDICATION DURING ELECTRICAL DISCHARGE

BACKGROUND OF THE INVENTION

1. Field of Invention

The present invention generally relates to the art of electrochemical cells. More particularly, the present invention is directed to a cell construction that makes use of unbalanced electrode components comprising one of the electrodes of an electrochemical cell, i.e., comprising either the anode or the cathode, to provide for end-of-life (EOL) or constant state-of-discharge indication.

In the present invention, either the anode or the cathode is characterized by an unbalanced structure provided by at least two dissimilar electrode components or electrode portions which each electrochemically react with the other electrode to provide electrochemical energy. The unbalanced electrode components can have dissimilar physical dimensions or dissimilar percent loadings of electrode active material. This renders the one dissimilar electrode component having the lesser physical dimension, i.e., the lesser surface area or lesser thickness, or having the lesser quantity of electrode active material, electrochemically unreactive prior to that of the greater of the dissimilar electrode components during the course of cell discharge. Upon the early exhaustion or unreactiveness of the lesser dissimilar electrode component, the total cell interelectrode working area is reduced by a predetermined factor. The remaining functional electrode component, i.e., the greater dissimilar electrode component provides the cell with sufficient capacity for electrical discharge at a predetermined lower energy level. The onset of reduced energy output acts as an end-of-life indication.

2. Prior Art

Battery powered implantable medical devices require some means of end-of-life indication for the battery in order that physicians have sufficient notice, or elective replacement indication (ERI), to complete replacement of the medical device and/or power source prior to system failure brought about by battery power depletion. Examples of such battery powered implantable devices are all types of pacemakers, implantable cardiac defibrillators, neurostimulators, drug delivery devices, and the like.

One method of providing end-of-life indication is through a specific electrochemical system. Certain cell systems have inherent electrochemical characteristics which are modified predictably with the progress of electrical discharge. One example is an alkali metal-halogen cell. Such a cell is described in U.S. Pat. No. 4,132,836 to Greatbatch and comprises an alkali metal anode, preferably lithium, a solid alkali metal-halogen electrolyte and a cathode comprising a mixture of two halogens, for example iodine and bromine. The two halogens provide for discharge of the cell at two different levels of cell output voltage thereby providing a two step output voltage-time characteristic.

Another example of an electrochemical system that is useful for providing end-of-life indication is an alkali metal-mixed metal oxide cell. Such a cell is described in U.S. Pat. No. 4,310,609 to Liang et al., which is assigned to the assignee of the present invention, and preferably comprises a lithium anode and a silver vanadium oxide cathode. The background or open-circuit voltage and the state-of-charge or expanded cell capacity of this system are well characterized functions of the depth-of-discharge of the cell. While this electrochemical system provides high energy density, the continuously sloping discharge curve makes Li/SVO cells impracticable as power sources for certain electronics that require a tighter output window.

It is also known to use other techniques in lieu of electrochemical means to demonstrate end-of-life indication for an electrochemical cell. In that respect, various electrode constructions have been described in the art for indicating state-of-discharge of an electrochemical cell and, subsequently, to predict end-of-life of the cell. A representative cell design is described in U.S. Pat. No. 4,563,401 to Kane et al., which comprises two anode-functioning members, one fitted inside the other. The anode members have cylindrical shapes with non-uniform lengths to provide a greater thickness where the anode members are coextensive. A cylindrical cathode is provided radially inside the anodes and during discharge, the thinner anode structure is depleted first.

This patent also describes a cell having two anode structures electronically coupled in parallel and having different thicknesses. The cathode material is placed at an intermediate location between the anode structures and both electrodes are separated from the casing by separator material. The present invention is preferably constructed in a case-negative or a case-positive configuration and both the anode and the cathode can be provided by the dissimilar internal electrode components.

SUMMARY OF THE INVENTION

An electrochemical cell constructed according to the present invention includes unbalanced electrode components or electrode portions providing one of the electrodes, i.e., either the anode or the cathode, as an end-of-life indicator or constant state-of-discharge indicator. The term "electrode" refers to either the anode or the cathode incorporated into either a primary or a secondary electrochemical cell, as is well known to those of ordinary skill in the art.

The unbalanced electrode components provide an internal cell construction wherein a portion of either the anode or the cathode has a specifically tailored dissimilar physical dimension or dissimilar quantity of electrode active material. At least two dissimilar electrode components, providing either the anode or the cathode, each electrochemically react with the other electrode during the course of electrical discharge. The one electrode component having the lesser physical dimension or the lesser percent loading of active material is rendered electrochemically exhausted or unreactive prior to the similar polarity electrode component having the greater dimension or greater percent loading of active material. The onset of unreactiveness of the lesser electrode component results in a measurable decrease in electrical discharge voltage as an end-of-life indication.

One embodiment of an electrochemical cell constructed according to the present invention has a "spirally wound" or jellyroll-type electrode assembly with either the anode or the cathode having a reduced thickness portion and a portion of a greater thickness. Assuming that the cathode has sufficient electrode active material to completely accommodate all the metal ions migrated from the anode, the reduced thickness anode portion completely oxidizes to form metal ions which migrate to the adjacent cathode to there be converted into atomic or molecular forms during discharge before the anode portion of greater thickness is exhausted. Given the similar interfacial surface areas between the spirally wound anode and cathode, the early electrochemical unreactiveness of the reduced thickness anode portion results in a measurable increase in internal cell impedance as an end-of-life indication.

Another embodiment of an electrochemical cell constructed according to the present invention has a prismatic cell design including a centralized electrode and two outer electrode components, each having an opposite polarity with respect to the central electrode and facing respective major faces of the central electrode. The central electrode can comprise the anode (or the cathode) and the outer electrode components can comprise the cathode (or the anode). The two outer electrode components have similarly sized interfacial surface areas facing the respective major surfaces of the central electrode, but are of differing thicknesses. During electrochemical discharge, the outer electrode component of lesser thickness is exhausted, i.e., rendered electrochemically unreactive, prior to the outer electrode of greater thickness. The early onset of unreactiveness of the one outer electrode having the lesser thickness results in a reduction of the total cell interfacial working electrode surface area by a factor of two. The outer electrode of greater thickness continues to provide the cell with sufficient remaining capacity for discharge at a predetermined output level.

In the case of the two outer electrode components comprising the anode, the anode active material of the one component having the lesser thickness is consumed and thereby rendered electrochemically unreactive prior to the other anode component having the greater thickness. Conversely, if the two outer electrode components comprise the cathode, the cathode active material of the one component having the lesser thickness is completely filled with anode ions and thereby rendered electrochemically unreactive prior to the other cathode component having the greater thickness.

The prismatic cell design of the present invention is also useful as an end-of-life indication for an unbalanced cell construction having a centralized electrode provided with at least two major faces of dissimilar surface areas facing respective outer electrode components of similar thicknesses and of similar interfacial working electrode surface areas as the respective dissimilar major faces of the central electrode. During electrochemical discharge, the outer electrode component of lesser surface area is rendered electrochemically unreactive prior to the outer electrode of greater surface area. The early depletion of the lesser surface area outer electrode component results in a factored reduction in the total cell discharge capacity which is directly related to the total cell interfacial working electrode surface area contributed by the unreactive electrode component.

A predictable factored reduction in the total cell discharge voltage can also include providing the two outer electrode components as the cathode provided with unbalanced percentages of cathode active material. The outer cathode component having the lesser percentage of cathode active material is rendered electrochemically unreactive by saturation by anode ions prior to the outer electrode having the greater percentage of cathode active material. Again, this early onset of electrochemical unreactiveness results in a predictable and predetermined reduction in the discharge voltage of the cell.

This latter cell configuration is also useful in a rechargeable secondary electrochemical cell wherein the two outer anode components have dissimilar weights, volumes or capacities and therefore varying capacity to intercalate alkali ions.

These and other aspects of the present invention will become increasingly more apparent to those skilled in the art by reference to the following description and to the drawings.

DESCRIPTION OF THE PREFERRED EMBODIMENTS

Figure 1:
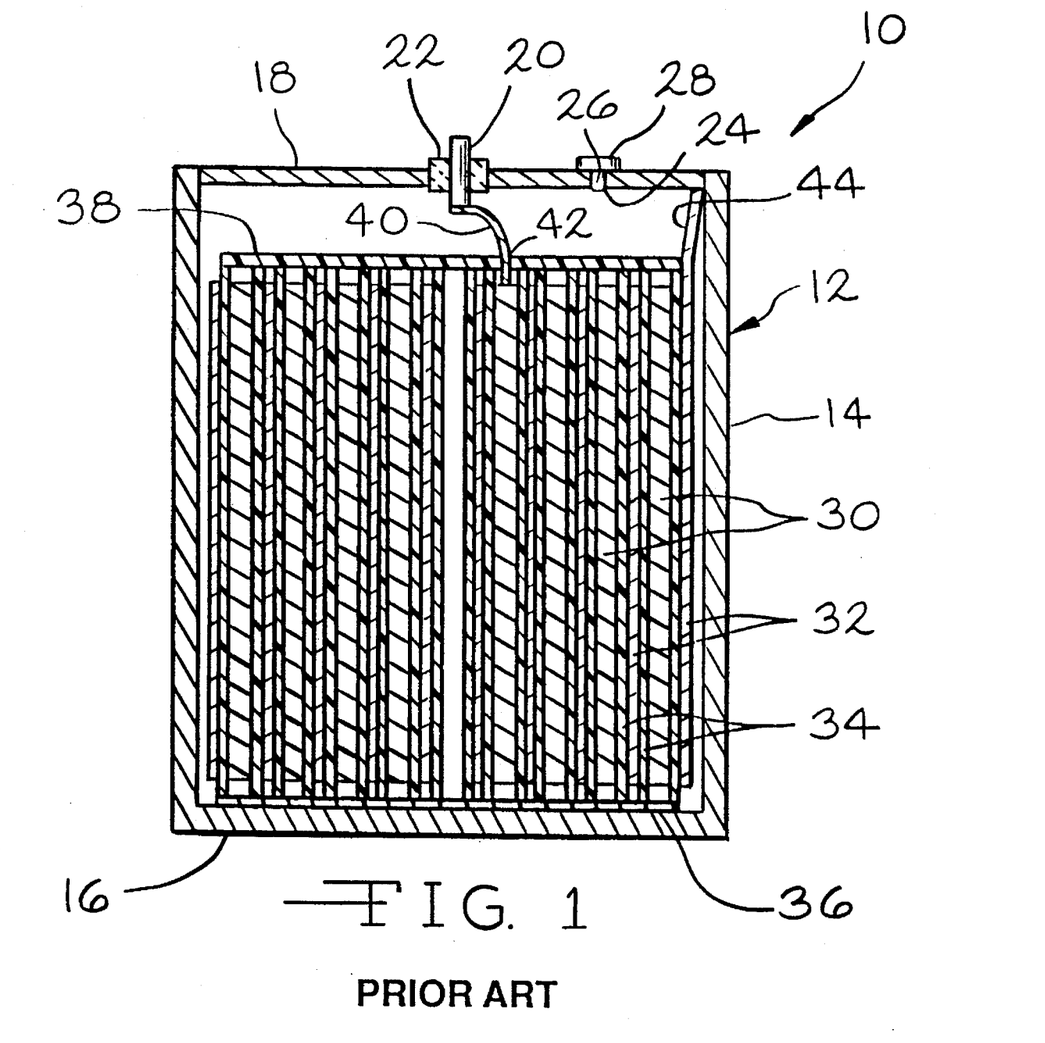
FIG. 1 is an elevational, cross-sectional view of an electrochemical cell 10 fabricated according to conventional practice.

FIG. 1 shows an exemplary construction of a "spirally wound" or jellyroll-type electrochemical cell 10 according to conventional practice. Cell 10 includes a hollow casing 12 generally in the form of a deep drawn can having a cylindrically shaped side wall 14 closed at the bottom by an integral end wall 16. Casing 12 is closed at the top by a lid 18 welded in place in a known manner. Casing 12 is made of metal such as stainless steel, and being electrically conductive provides one terminal or contact for making electrical connection between the cell 10 and its load. Lid 18 also is typically made of stainless steel. The other electrical terminal or contact is provided by a conductor or pin 20 extending from within the cell 10 and through casing 12, in particular through lid 18. Pin 20 is insulated electrically from the metal lid 18 by an insulator and seal structure 22. Pin 20 and seal 22 are typically of a corrosion resistant pin-glass combination such as molybdenum and TA23 glass. An electrolyte fill opening 24 is provided in lid 20 and is closed by a ball 26 and cap 28 welded or otherwise secured in place after the cell 10 has been filled with an activating electrolytic solution (not shown), as is well known to those skilled in the art.

FIG. 1 shows that the prior art spirally wound electrochemical cell 10 further comprises a cathode 30 in casing 12 and an anode 32 separated from the cathode 30 by separator material 34. The cathode 30 is typically fabricated by sheeting a cathode active material onto an expanded metal foil (not shown) and the anode 32 is made by laminating battery grade anode active material onto a metal conductor grid (not shown). The separator 34 is provided between the anode 32 and the cathode 30 and it typically comprises a nonwoven glass fiber, hydrocarbon or fluorocarbon polymer. The two electrodes 30 and 32 have similar interfacial surfaces areas, and along with the intermediate separator 34 they are wound together in the spiral or jellyroll type formation shown and placed inside the casing 12.

Typically, the jellyroll electrode assembly rests on an insulation plate 36 contacting the end wall 16. This prevents the wound anode-cathode assembly from telescoping downwardly.

An insulating plastic cover 38 having the shape of a circular plate rests on the upper edges of the separator material 34. An electrical lead 40 is fitted through an opening 42 in the insulating cover 38 with one end in electrical contact with the cathode 30 and the other end extending to conductor 20 mounted in glass seal 22. Finally, anode 32 includes at least one terminal or contact connection such as tab 44 extending out from the anode conductor (not shown) embedded in the anode active material and welded to the side wall 14 in a case-negative configuration.

Figure 2:
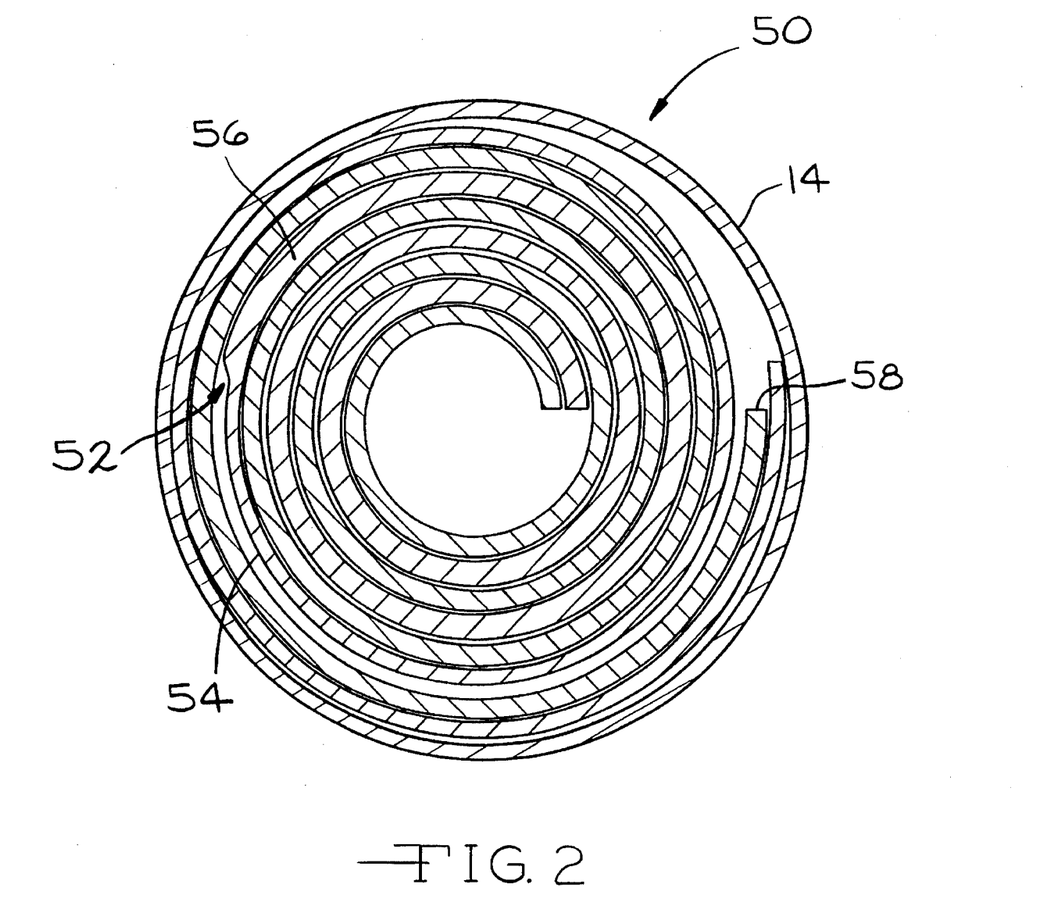
FIG. 2 is a plan cross-sectional view of a spirally wound electrochemical cell 50 similar to that shown in FIG. 1 except that cell 50 includes a reduced thickness anode portion 54 according to the present invention.

FIG. 2 shows a plan cross-sectional view of a spirally wound electrochemical cell 50 similar to cell 10 shown and described with respect to FIG. 1 but with the anode 52 having a reduced thickness portion 54 and a portion 56 of a greater thickness.

As is well known to those skilled in the art, the anode 52 contains the active reducing material and the cathode 58 contains the active oxidizing material. In that respect, the electrochemical reaction at the anode 52 includes oxidation to form metal ions during discharge of the cell 50 and the electrochemical reaction at the cathode 58 involves conversion of ions which migrate from the anode 52 to the cathode 58 into atomic or molecular forms. Assuming that the cathode 58 has sufficient electrode active material to completely intercalate all the metal ions migrated from the anode 52, the reduced thickness of anode portion 54 as compared to the thickness of anode portion 56 dictates that anode portion 54 will completely oxidize to form metal ions which migrate to the adjacent cathode 58 and there be converted into atomic or molecular forms during discharge of the cell 50 before the greater thickness anode portion 56 is exhausted. In other words, the greater thickness of anode portion 56 dictates that this portion will continue to oxidize to form metal ions sufficient to support discharge of the cell 50 for a period of time after ionic migration to that portion of the cathode 58 adjacent to the reduced thickness anode portion 54 has ceased. Given the similar interfacial surface areas between the anode 52 and the cathode 58, this early electrochemical unreactiveness of anode portion 54 results in a reduction in the total cell interfacial working electrode surface area. As a result, the internal impedance in the cell 50 increases in order to compensate for this reduction in the total cell interfacial working electrode surface area contributed by anode portion 54. The magnitude of the increase in internal impedance is a factor dependent on that portion of the total interfacial working electrode surface area contributed by the reduced thickness anode position 54.

Figure 3:
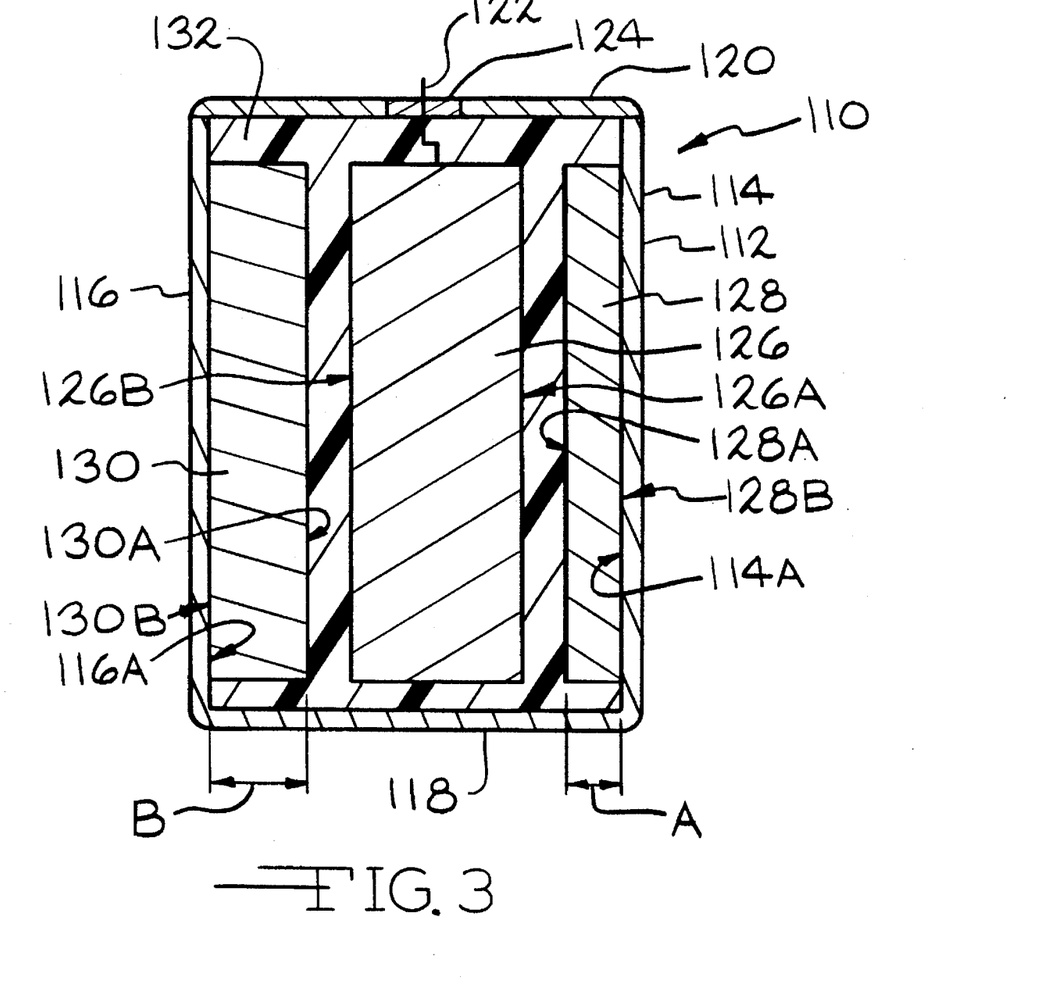
FIG. 3 is a cross-sectional view of an electrochemical cell 110 of the present invention having a central electrode 126 and two opposite polarity electrode components 128 and 130 of similar interfacial electrode working surface areas, but of dissimilar thicknesses.

FIG. 3 shows another embodiment of an electrochemical cell 110 constructed according to the present invention. Electrochemical cell 110 is formed in a case-negative configuration and includes a container 112 comprising spaced apart side walls 114 and 116 extending to and meeting with opposed end walls (not shown) that join to a bottom wall 118 and a cover 120. Container 112 is preferably made of an electrically conductive material such as stainless steel and has a generally rectangular shape in plan view (not shown), as is apparent to those skilled in the art. Being electrically conductive, container 112 provides one terminal or contact for making electrical connection between cell 110 and its load. The other electrical terminal or contact is provided by a conductor or pin 122 extending from within cell 110 and through container 112, in particular through cover 120. Pin 122 is insulated from the metal cover 120 by an insulator and seal structure such as glass-to-metal seal 124 to thereby provide the cathode terminal when container 112 serves as the anode terminal.

The cell electrode construction includes a centralized electrode means 126 that can function as a cathode (or an anode) and two spaced apart electrode components or portions 128 and 130 that function as the opposite polarity electrode being either the anode (or the cathode). In that light, the embodiment of the present invention shown in FIG. 3 will first be described with respect to the central electrode 126 comprising the cathode and the spaced apart electrode components 128 and 130 comprising the anode. The opposite electrode configuration, namely the central electrode 126 comprising the anode and the spaced apart electrode components 128 and 130 comprising the cathode, will be described hereinafter.

The anode components 128 and 130 each have respective interior surfaces 128A and 130A, and outer surfaces 128B and 130B contacting the inner surfaces 114A and 116A of the side walls 114 and 116. While not shown in the drawing, it should be understood that the area of the interior surfaces 128A and 130A and the outer surfaces 128B and 130B of electrode components 128 and 130, when viewed normal to the plane of the cross-section of cell 110 shown in FIG. 3, are similar. This provides similar interfacial surface areas between the major faces 126A and 126B of central cathode 126 and the respective interior surfaces 128A and 130A of the anode components 128 and 130 thereby having similar interelectrode electrochemical activity during cell discharge. In this embodiment of the present invention, the distinguishing characteristic is that anode component 128 has a thickness, indicated as "A", while anode component 130 has a somewhat greater thickness, indicated as "B".

Centralized cathode electrode 126 is located at an intermediate position between anode components 128 and 130 with its first major surface 126A facing the inner surface 128A of anode component 128 and its second major surface 126B facing the inner surface 130A of anode component 130. The inner surfaces 126A and 126B of cathode 126 are similar in surface area with respect to each other and, in turn, they are similar in surface area to the respective inner surfaces 128A and 130A of anode components 128 and 130 which they face.

A suitable separator 132 envelopes the central cathode electrode 126 to provide physical separation between the anode components 128 and 130 and the cathode electrode 126. Separator 132 is of electrically insulative material to prevent an internal electrical short circuit in the cell 110 between the anode components 128 and 130 and the cathode electrode 126. A suitable electrolyte solution (not shown) is filled into the container 112 to serve as a medium for migration of ions between anode components 128, 130 and the cathode 126. The separator material also must be chemically unreactive with the materials of the anode and cathode electrodes and be chemically unreactive with and insoluble in the electrolyte solution. The electrolyte solution serves as a medium for migration of ions between the anode and the cathode during the electrochemical reactions of the cell. In that respect, separator 132 must additionally have a degree of porosity sufficient to allow flow therethrough of the electrolyte solution during electrochemical reaction of the cell 110.

The resulting cell 110 is a case-negative electrical configuration, i.e., the anode components 128 and 130 are in contact with and therefore electrically connected to the conductive container 112 serving as the negative polarity external electrical connection for the cell 110, and pin 122 is connected to the cathode electrode 126 serving as the positive external electrical connection for the cell.

Cell 110 of the present invention thus operates in the following manner. When the ionic conductive electrolyte solution becomes operatively associated with the anode components 128 and 130 and the cathode 126 of the cell, an electrical potential difference develops between the terminals operatively connected to the anode and the cathode. Assuming that cathode 126 has sufficient electrode active material to completely intercalate all the metal ions migrated from anode components 128 and 130, the smaller thickness A of anode component 128 as compared to the thickness B of anode component 130 dictates that anode component 128 will completely oxidize to form metal ions which migrate to the adjacent interior surface 126A of cathode 126 and there be converted into atomic or molecular forms during discharge of cell 110, before anode component 130 is exhausted. Since the interfacial surface areas between central cathode 126 and anode components 128 and 130 are similar, this early depletion of anode component 128 results in a reduction in the total cell interfacial working electrode surface area by a factor of two. At that time, internal impedance in the cell increases to compensate for the loss in that portion of the total cell interfacial working electrode surface area contributed by anode component 128. In this case, anode component 128 is contributing one-half the total cell interfacial working electrode surface area. This change in resistance or impedance is detectable, as is well known to those skilled in the art, and as such it is interpretable as a cell end-of-life indication.

It can readily be understood that the cell construction of the present invention shown in FIG. 3 can also be arranged in a case-positive configuration. In such a configuration, central electrode 126 serves as the anode and electrode components or portions 128 and 130 serve as the cathode. The cathode components 128 and 130 are now in contact with and therefore electrically connected to the conductive container 112 serving as the positive polarity external electrical connection for the cell 110, and pin 122 is connected to the anode electrode 126 serving as the negative external electrical connection for the cell 110. When the ionic conductive electrolyte solution becomes operatively associated with the cathode components 128 and 130 and the anode 126, an electrical potential difference is developed between the terminals operatively connected to the cathode and the anode. As occurred in the previously described case-negative configuration of this embodiment of the present invention, electrochemical reactions at the anode 126 include oxidation to form metal ions during discharge of the cell and the electrochemical reaction at the cathode involves conversion of those ions into atomic or molecular forms that migrate from the anode 126 to the cathode components 128 and 130.

Assuming that anode 126 has sufficient electrode active material to completely saturate cathode components 128 and 130 through ionic intercalation, the greater thickness of cathode component 130, having thickness B, as compared to cathode component 128, having thickness A, dictates that the anode 126 will continue to oxidize to form metal ions during discharge of the cell 110 by ionic migration to the adjacent interior surface 130A of cathode component 130 and there be converted into atomic or molecular forms for a period of time after ionic migration to the adjacent interior surface 128A of cathode component 128 has ceased. Given the similar interfacial surface areas between central anode 126 and cathode components 128 and 130, this early electrochemical unreactiveness of cathode component 128 results in a reduction in the total cell interfacial working electrode surface area. As previously discussed with respect to the case-negative configuration, the internal impedance in the cell 110 increases in order to compensate for this reduction in the total cell interfacial working electrode surface area contributed by cathode component 128. This change in resistance or impedance is detectable as an end-of-life indicator for cell 110.

Figure 4:
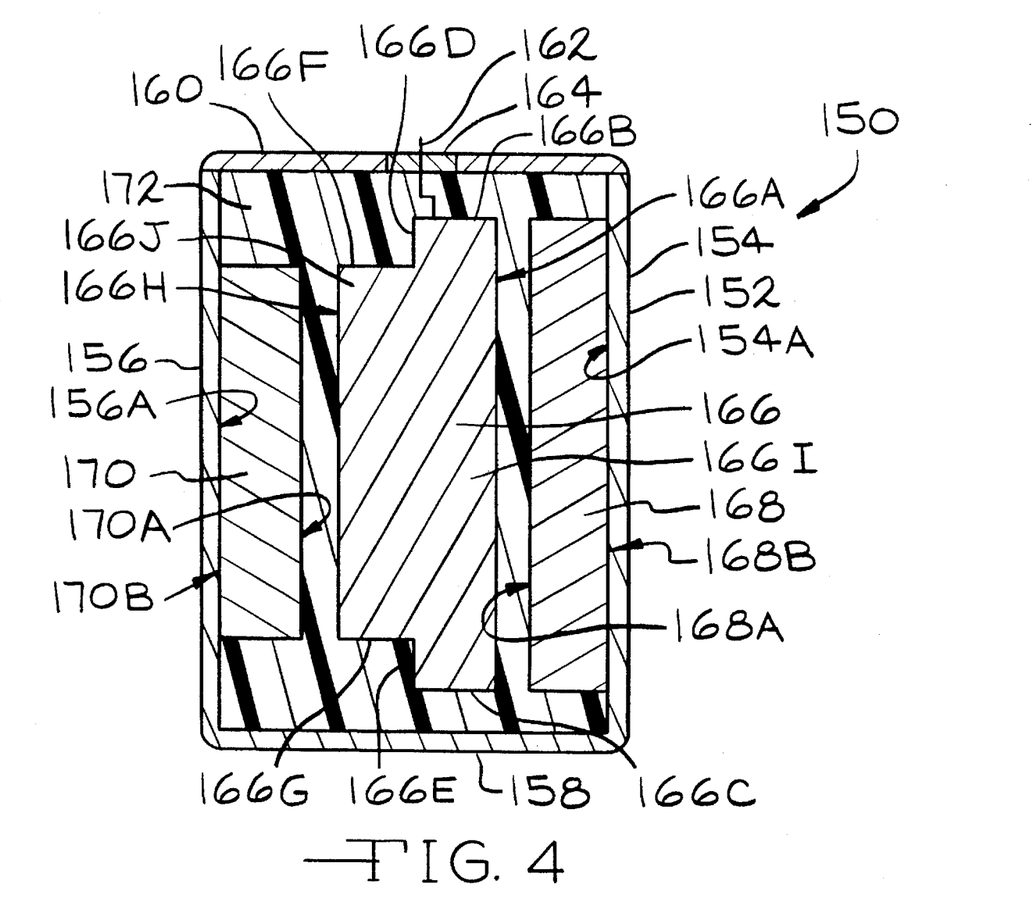
FIG. 4 is a cross-sectional view of an electrochemical cell 150 of the present invention comprising a central electrode 166 having major faces 166A and 166H of dissimilar surface areas facing two outer electrode components 168 and 170 of similar thicknesses and of similar interfacial working electrode surface areas as faces 166A and 166H.

FIG. 4 shows another embodiment of an electrochemical cell 150 according to the present invention. Electrochemical cell 150 is similar to the cell 110 shown in FIG. 3 and it includes a container 152 comprising spaced apart side walls 154 and 156 extending to and meeting with opposed end walls (not shown) that join to a bottom wall 158 and a cover 160. Container 152 is preferably made of an electrically conductive material such as stainless steel and has a generally rectangular shape in plan view (not shown), as is well known to those skilled in the art. Being electrically conductive, container 152 provides one terminal or contact for making electrical connection between cell 150 and its load. The other electrical terminal or contact is provided by a conductor or pin 162 extending from within cell 150 and through container cover 160. Pin 162 is insulated from the metal cover 160 by an insulator and seal structure such as glass-to-metal seal 164 to thereby provide the cathode terminal when container 152 serves as the anode terminal.

The cell electrode construction includes a centralized electrode 166 that can function as a cathode (or an anode) and two spaced apart electrode components or portions 168 and 170 that function as the anode (or the cathode). The anode components 168 and 170 each have respective interior surfaces 168A and 170A, and they have outer surfaces 168 and 170, contacting the inner surfaces 154A and 156A of the side walls 154 and 156. The central cathode electrode 166 is shown in cross-section having a first face 166A that joins to first upper and lower walls 166B and 166C as viewed in FIG. 4 that meet step portions 166D and 166E which extend to second upper and lower walls 166F and 166G which in turn meet with a second face 166H. The area of first face 166A is similar to that of the interior surface 168A of electrode component 168, while the area of second face 166H is similar to that of the interior surface 170A of electrode component 170. As clearly shown, however, the area of first face 166A of electrode component 166 is greater than that of second face 166H. Also, the thickness of electrode component 168 is similar to that of portion 166I of central electrode 166 extending from first face 166A to the step portions 166D and 166E and the thickness of electrode component 170 is similar to that portion 166J of central electrode 166 extending therefrom to second face 166H.

As previously described with respect to the cell 110 shown in FIG. 3, a suitable separator 172 envelopes the central electrode 166 to provide physical separation between electrode 166 and electrode components or portions 168 and 170. A suitable electrolyte solution (not shown) is filled into the container 152 to serve as a medium for migration of ions between the components 168 and 170 and the central cathode 166.

When components 168 and 170 comprise the anode, the resulting cell is a case-negative electrical configuration, i.e., the anode components 168 and 170 are in contact with and therefore electrically connected to the conductive container 152 serving as the negative polarity external electrical connection for cell 150, and pin 162 is connected to the central cathode electrode 166 serving as the positive external electrical connection for the cell. Then, when the ionic conductive electrolyte solution becomes operatively associated with the anode components 168 and 170 and the central cathode component 166 of the cell 150, an electrical potential difference develops between the terminals operatively connected to the anode and the cathode.

Assuming that cathode 166 has sufficient electrode active material to completely intercalate all the metal ions migrated from anode components 168 and 170, the greater surface area of anode component 168 in comparison to anode component 170 dictates that anode component 168 will undergo oxidative electrochemical reaction with the first portion 166I of central cathode 166 for a period of time after the electrode active material comprising component 170 of lesser surface area has completely migrated to the adjacent second portion 166J of central electrode 166. Since the thicknesses of electrode components 168 and 170 are similar, this early depletion or unreactiveness of component 170 results in a reduction in the total cell interfacial working electrode surface area by a factor related to that portion of the total surface area of the first and second faces 166A and 166H of central electrode 166 contributed by the second portion 166J. At that time, internal impedance in the cell 150 increases by a factor indirectly related to the portion of the total cell interelectrode working surface area of central electrode 166 contributed by second portion 166J. This change in resistance or impedance is detectable as an end-of-life indication.

As is apparent to those skilled in the art, the cell of FIG. 4 also can be arranged in a case-positive configuration wherein central electrode 166 provides the anode and electrode components or portions 168 and 170 provide the cathode. Assuming that anode 166 has sufficient electrode active material to completely saturate cathode components 168 and 170 through ionic intercalation, the greater surface area of the cathode component 168 as compared to cathode component 170 dictates that anode 166 will continue to oxidize to form metal ions during discharge of cell 150 by migration to the adjacent face 168A of cathode component 168 and there be converted into atomic and molecular forms for a period of time after ionic migration to the adjacent interior surface 170A of component 170 has ceased. This early unreactiveness of component 170 again results in a reduction in the total cell interfacial working electrode surface area by a factor related to that portion of the total surface area of the first and second faces 166A and 166H of central anode 166 contributed by the second portion 166J. Internal cell impedance then increases by a factor indirectly related to the portion of the total working cell interelectrode working surface area of central electrode 166 contributed by second portion 166J. This change in resistance or impedance is detectable as an end-of-life indicator.

Figure 5:
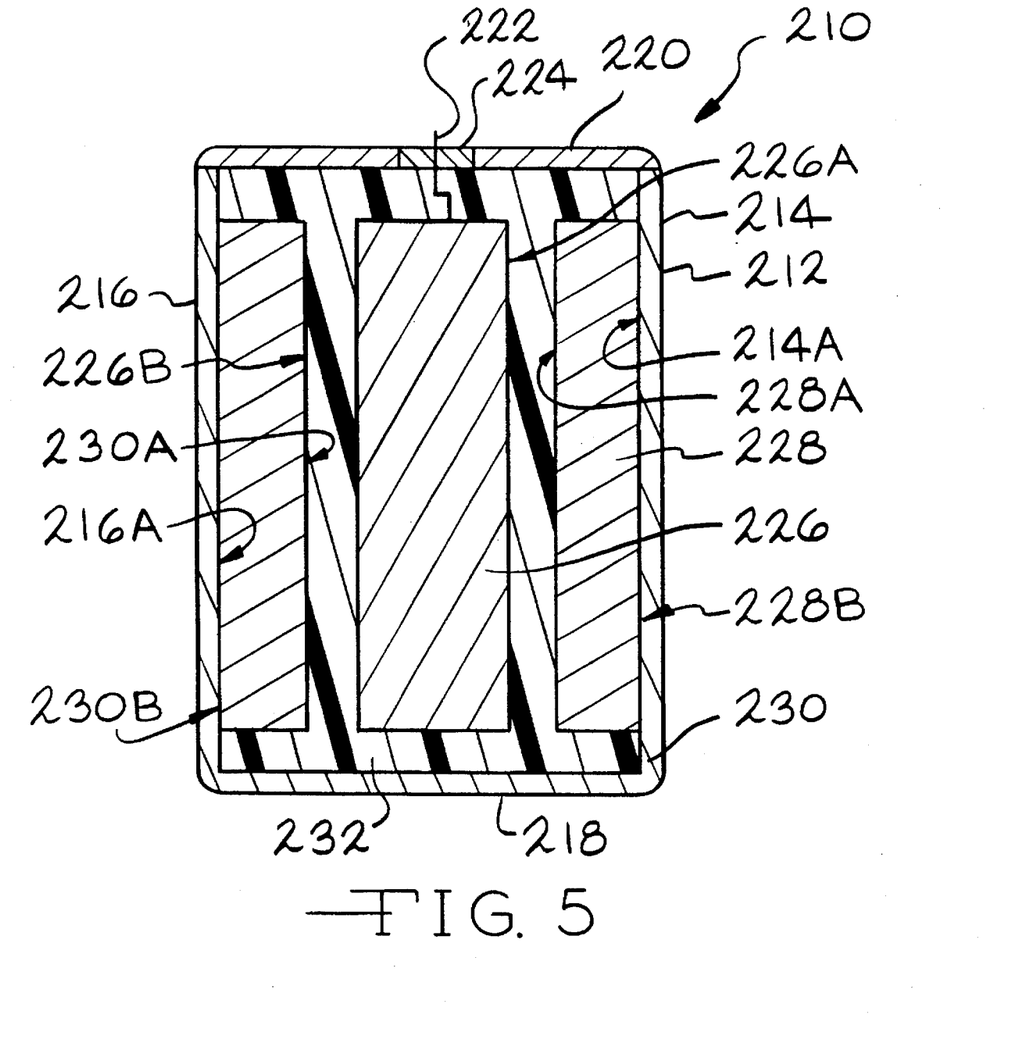
FIG. 5 is a cross-sectional view of an electrochemical cell 210 of the present invention having a central electrode 226 that functions as the anode and two spaced apart electrode components 228 and 230 that function as the cathode and that have either dissimilar loading percents of cathode active material or dissimilar ability to intercalate and deintercalate alkali metal ions in a secondary electrochemical cell.

Another embodiment of a case-positive electrochemical cell 210 constructed according to the present invention is shown in FIG. 5. Electrochemical cell 210 is similar in construction to cell 110 shown in FIG. 3 and cell 150 shown in FIG. 4, and includes a container 212 comprising spaced apart side walls 214 and 216 extending to and meeting with opposed end walls (not shown) that join to a bottom wall 218 and a cover 220. Container 212 is preferably made of an electrically conductive material such as stainless steel and has a generally rectangular shape in plan view (not shown), as is obvious to those of ordinary skill in the art. Being electrically conductive, container 212 provides one terminal or contact for making electrical connection between cell 210 and its load. The other electrical terminal or contact is provided by a conductor or pin 222 extending from within cell 210 and through container cover 220. Pin 222 is insulated from the metal cover 220 by an insulator and seal structure such as glass-to-metal seal 224 to thereby provide the anode terminal when container 212 serves as the cathode terminal.

The cell electrode construction includes a centralized electrode 226 that functions as the anode and two spaced apart electrode components or portions 228 and 230 that function as the cathode. The cathode components 228 and 230 each have respective interior surfaces 228A and 230A and outer surfaces 228B and 230B which outer surfaces contact the inner surfaces 214A and 216A of the side walls 214 and 216. While not necessary, it is preferred that the area of the interior surfaces 228A and 230A and the outer surfaces 228B and 230B of cathode components 228 and 230, are similar. This provides similar interfacial surface areas between the major faces 226A and 226B of central anode 226 and the respective interior surfaces 228A and 230A of the cathode components 228 and 230 thereby having similar interelectrode electrochemical activity during cell discharge. In this embodiment of the present invention, the distinguishing characteristic is that cathode component 228 has a greater loading percentage of cathode-active material than cathode component 230.

As previously described with respect to cells 110 and 150 shown in respective FIGS. 3 and 4, respectively, a suitable separator 232 envelopes the central anode 226 to provide physical separation between anode 226 and cathode components 228 and 230. A suitable electrolyte solution (not shown) is filled into the container 212 to serve as a medium for migration of ions between the cathode components 228 and 230 and the central anode 226.

An exemplary cell according to this embodiment can comprise, but is not limited to, an anode 226 selected from Groups IA, IIA and IIIB of the Periodic Table of the Elements. More specifically the anode material may consist of lithium, sodium, potassium, calcium, magnesium or their alloys, or any alkali metal or alkali-earth metal capable of functioning as an anode. For example, Li—Si, Li—Al, Li—B and Li—Si—B alloys may serve as the anode material.

The cathode components 228 and 230 are of a solid material and can comprise such materials as, but not limited to, manganese dioxide, silver vanadium oxide, copper silver vanadium oxide, titanium disulfide, copper oxide, copper sulfide, iron sulfide, iron disulfide, vanadium oxide, copper vanadium oxide, carbon, fluorinated carbon and mixtures thereof. The cathode components 228 and 230 are pressed into a pellet of a desired shape with the aid of a binder material, such as polytetrafluoroethylene or other suitable polymeric materials, and a material having electronic conduction characteristics, such as graphite and carbon black.

End-of-life indication is provided with electrode components 228 and 230 differing in their percent of cathode active material. By way of example, component 228 may have 80% by weight silver vanadium oxide, the remaining material comprising binder material and conductive diluents while component 230 has 90% by weight silver vanadium oxide, the remaining material comprising binder and conductive materials.

When components 228 and 230 comprise the cathode, the resulting cell is a case-positive electrical configuration, i.e., the cathode components 228 and 230 are in contact with and therefore are electrically connected to the conductive container 212 serving as the positive polarity external electrical connection for cell 210, and pin 222 is connected to the central anode electrode 226 serving as the negative external electrical connection for the cell. Then, when the ionic conductive electrolyte solution becomes operatively associated with the cathode components 228 and 230 and the central anode component 226 of the cell 210, an electrical potential difference develops between the terminals operatively connected to the anode and the cathode.

During electrochemical discharge of the cell, and assuming that anode 226 has sufficient electrode active material to completely saturate cathode components 228 and 230 through ionic intercalation, cathode component 228 having the lesser percentage of cathode active material becomes electrochemically unreactive to ions migrating from the central anode electrode 226 before cathode component 230 having the greater percentage of cathode active material becomes unreactive. This early electrochemical unreactiveness of cathode component 228 results in a reduction of the total cell interelectrode working capacity and an inversely proportionate increase in the internal impedance of cell 210. The internal impedance increases in order to compensate for the reduction in the total cell interelectrode working surface area contributed by cathode component 228. This change in resistance is detectable as an end-of-life indication.

It is contemplated and within the scope of the present invention that the prismatic cell construction shown in FIG. 5 having the internal cathode components provided with dissimilar percentages of cathode active material is also useful in a secondary electrochemical cell. Such cells can be discharged and recharged through many cycles before disposal of the cell becomes necessary.

An exemplary secondary electrochemical cell described with respect to the cell construction shown in FIG. 5 comprises a central electrode 226, such as a lithiated material serving as the cathode, and two outer spaced apart anode components or portions 228 and 230 facing respective major faces of the central electrode 226. Preferably, the lithiated cathode 226 is stable in air and hence can be handled readily. Examples of such air-stable lithiated materials include lithiated nickel oxide, lithiated cobalt oxides and lithiated mixed oxides of cobalt with nickel or tin. Among the suitable oxides are $LiNiO_2$; $LiCoO_2$; $LiCo_{0.92}Sn_{0.08}O_2$; and $LiCo_{1-x}Ni_xO_2$.

The anode components 228 and 230 preferably have similar thicknesses and similar interfacial surface areas with respect to the similar major faces 226A and 226B of the cathode 226. The two anode components 228 and 230 are capable of reversibly incorporating the alkali metal ions comprising the cathode 226 and they preferably are formed from a particulate composition including carbon together with a filamentary, electrical, conductive material such as carbon black. As used in this disclosure, the term "carbon" should be understood as referring to forms of carbon other than diamond. The carbonaceous composition of the anode components 228 and 230 each have a surface area subsequent to intercalation with the alkali metal which is substantially similar to the surface area of the composition prior to intercalation with the alkali metal. Such compositions have been associated with little initial capacity loss in rechargeable electrochemical cells. During electrochemical charging, the alkali metal ions from the cathode 226 incorporate into the carbonaceous material of the anode components 228 and 230 to provide an intercalated anode material having the general formula $Am_xC_6$. In the case of lithium as the alkali metal, the intercalated anode material has the general formula $Li_xC_6$. For a more detailed discussion of carbonaceous electrodes for lithium cells reference is made to U.S. Pat. No. 5,028,500 to Fong et al., the disclosure of which is hereby incorporated by reference.

In this embodiment of the present invention comprising a secondary electrochemical cell, the anode components 228 and 230 comprise particulate compositions having dissimilar capacities. A filamentary conductive material such as carbon black can also be added to components 228 and 230. In that respect and assuming that cathode 226 has sufficient electrode active material to completely saturate anode components 228 and 230 through ionic intercalation, during electrical discharge and with the anode components 228 and 230 in a charge state, electrode component 230 having the lesser capacity will be totally discharged by intercalation of lithium in cathode 226 prior to component 228. In other words, anode component 230 reaches electrochemical unreactiveness prior to component 228 which results in a reduction of the total cell interelectrode working area. The internal impedance in the cell 210 then increases in order to compensate for this reduction in the total cell interelectrode working area contributed by anode component 230. This change in impedance or resistance is detectable as a state-of-charge indication.

During recharge, the process is reversed under the influence of an externally applied potential so that lithium is added to the anode components 228 and 230 and deintercalated from the intercalatable material of cathode 226, as is well known to those of skill in the art. After deintercalation, the cell 210 is once again in a state capable of being electrically discharged as just described in detail. Thus, the embodiment of the present invention described with respect to cell 210 as a secondary electrochemical system is capable of numerous charge to discharge and back again to recharge cycles wherein during each discharge the anode components 228 and 230 in conjunction with the cathode 226 provide state-of-charge indication.

The present invention is illustrated further by the following example:

EXAMPLE I

A plurality of electrochemical cells were constructed according to the embodiment of the present invention shown and described with respect to FIG. 3 having a central cathode and unbalanced anode components disposed on either side of the cathode. The anode comprised lithium foil associated with a nickel anode current collector. The cathode was formed from a fluorinated carbon, carbon black and polytetrafluorothylene mixture. These constituents were thoroughly mixed in a suitable solvent and pressed to both sides of a titanium current collector to form a cathode laminate. The anode and cathode along with an intermediate separator were then placed inside of a prismatic housing, as is well known to those skilled in the art. This $Li/CF_x$ electrochemical system was activated with an electrolyte comprising a lithium salt dissolved in an aprotic organic solvent.

Six $Li/CF_x$ cells having various "unbalanced" anodes according to the present invention and identified herein as Cell Numbers 90400 to 90405 and three control $Li/CF_x$ cells have balanced anodes and identified herein as cell number 90406 to 90408 were discharged under a 1 KΩ load at 37°

C. In particular, Cell Numbers 90400 to 90402 were fabricated with one of the anode components consisting of a lithium-magnesium alloy providing 10% of the total anode weight and positioned on one side of the central $CF_x$ cathode, and the other anode component consisting of pure lithium providing 90% of the total anode weight and positioned on the opposite side of the cathode (10/90). Cell Numbers 90403 to 90405 were fabricated having a similar unbalanced anode configuration except that both anode components contained pure lithium. Cell Numbers 90406 to 90408 were fabricated with each anode component consisting of 50% of the total anode weight to represent the standard cell design (50/50). In all cases, the anode components had similar interfacial working areas as the major faces of the central cathode, whose major faces were likewise similar.

These prismatic cells were then subjected to a conditioning predischarge regime (burn-in) in which they were placed under 1.5 kohm loads at 37° C. for a period of 18 hours. After this, the cells were placed on open circuit storage at 37° C. for one week, immediately preceding the application of a 20 mA acceptance pulse. This pulse consisted of four waves, each applied for a period of 10 seconds, followed by a 15 second rest period between waves. After another one week open circuit storage period at 37° C., the cells were placed under 1 kohm loads for discharge. Approximately every 10 days, the cells were placed on open circuit storage at 37° C. so that their AC impedance (ACI) spectra could be recorded as a function of the depth of discharge. After the ACI spectra were recorded at 37° C. the cells were again placed under load and the discharge continued. The spikes in the data are due to the open circuit periods during which the ACI spectra were recorded.

Figure 6:
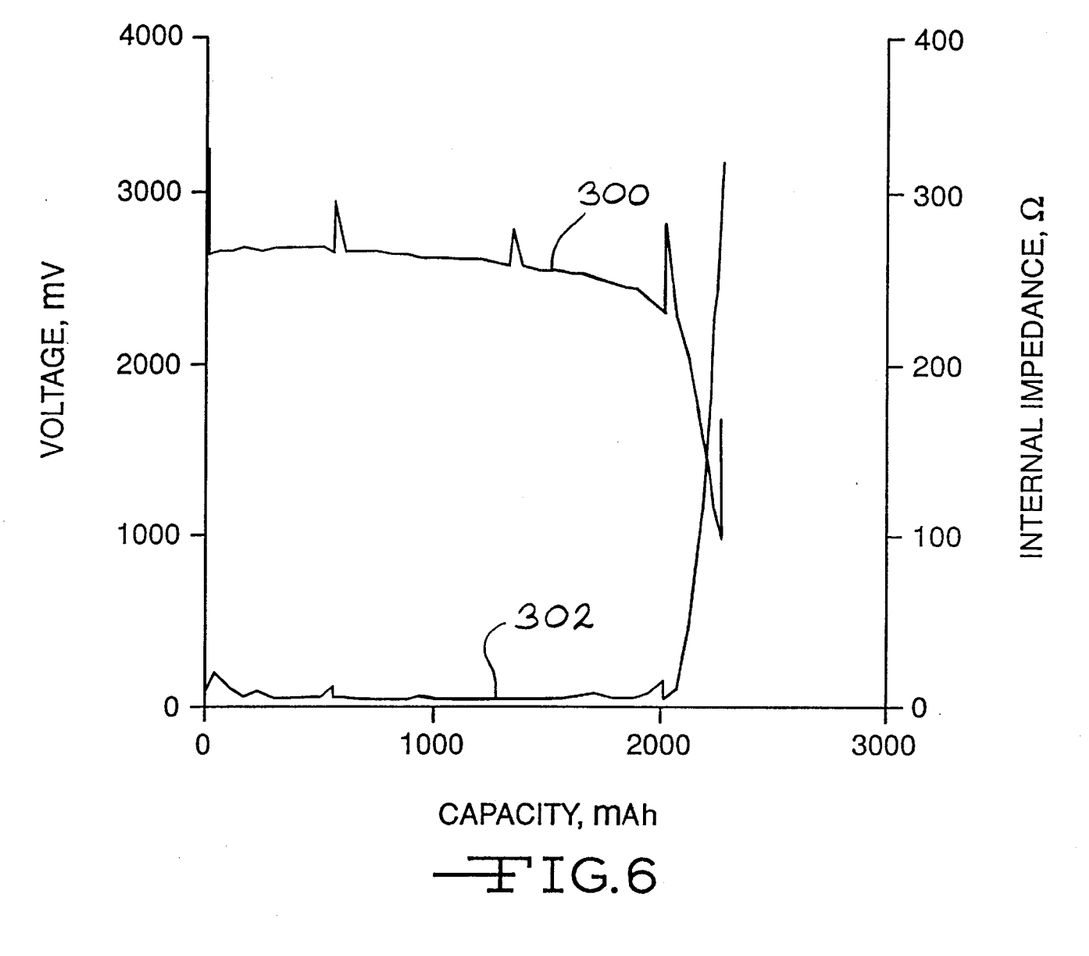
FIGS. 6 to 8 are average discharge curves for various Li/CF$_x$ electrochemical systems fabricated to provide end-of-life indication according to the present invention.
Figure 7:
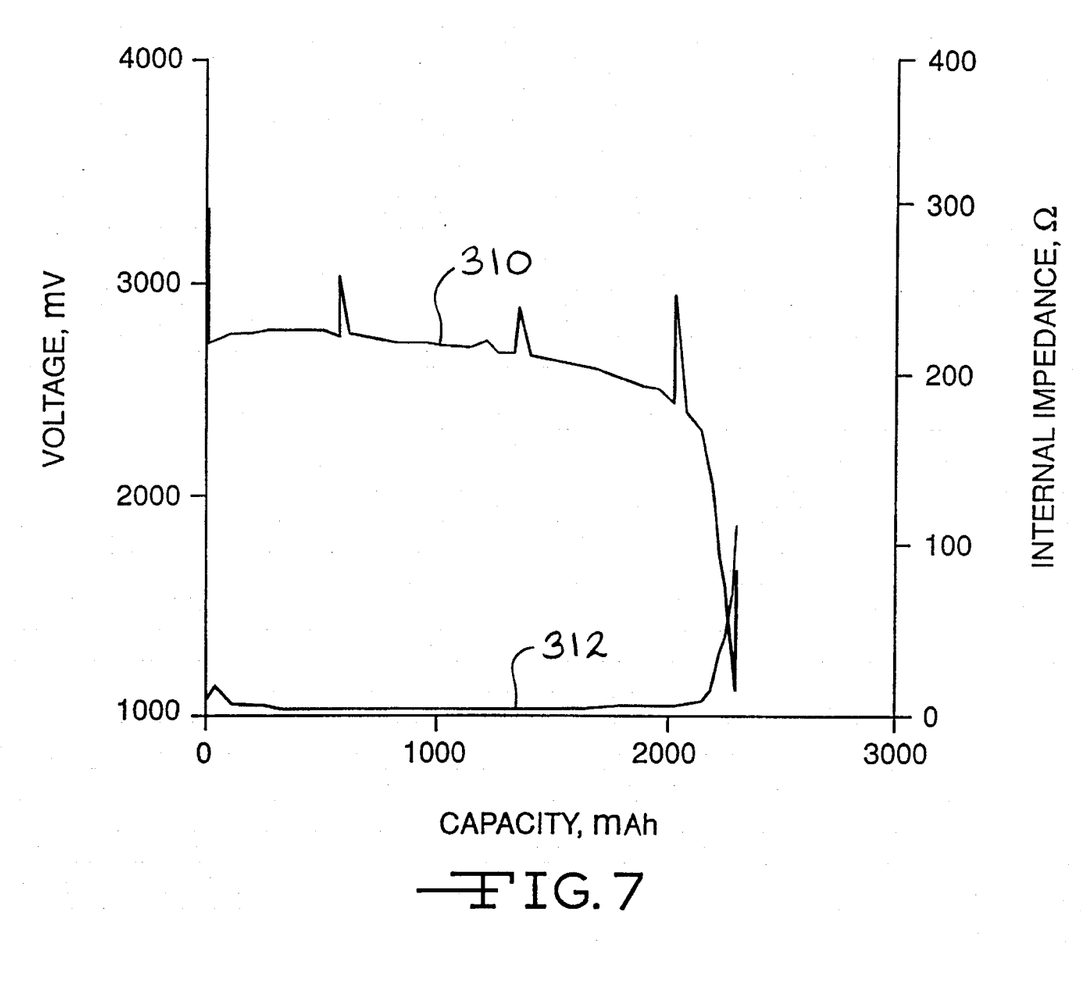
Figure 8:
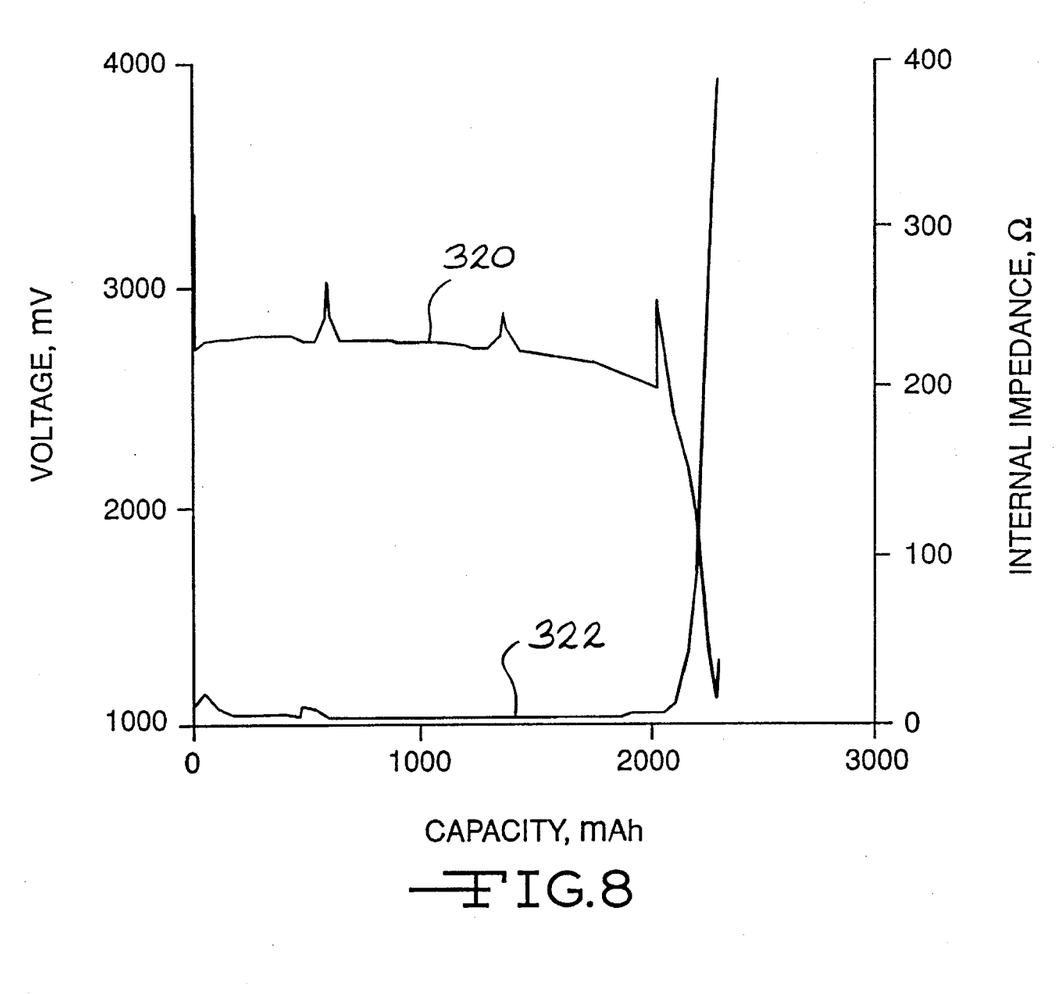

FIG. 6 shows the results of the 1 kohm discharge testing wherein curve 300 indicates average discharge voltage for Cell Numbers 90400 to 90402, and curve 302 indicates the average impedance for these cells. In a like manner, FIG. 7 shows the 1 kohm discharge testing results for Cell Numbers 90403 to 90405 wherein curve 310 indicates the average discharge voltage for these cells and curve 312 indicates the average impedance for these cells. Finally, FIG. 8 shows the 1 kohm discharge testing results of Cell Numbers 90406 to 90408 wherein curve 320 indicates the average discharge voltage for these cells and curve 322 indicates the average impedance for these cells.

Results of this discharge testing are shown in Table 1 wherein the capacity to 2.0 volts and the delta capacity between the cells at 2.6 volts and 2.0 volts is presented. The cells with the unbalanced anodes at 10/90 have a much higher delta capacity than the cells with balanced electrodes, i.e., Cell Numbers 90406 to 90408 having the 50/50 anode configuration. The extended capacity between 2.6 volts and 2.0 volts provides a longer time to plan replacement of an associated medical device.

TABLE 1

Use of Unbalanced Anodes as EOL Indicator

| Serial Number | Anode design | Cathode weight, g | Theoretical capacity, mAh | Actual capacity at 2 V, mAh | % theoretical capacity achieved | Capacity at 2.6 V, mAh | ΔmAh between 2.0 and 2.6 V |
|---|---|---|---|---|---|---|---|
| 90400 | "10/90" | 3.158 | 2471 | 2177 | 88.10 | 1589 | 588 |
| 90401 | Li—Mg alloy/Li | 3.150 | 2465 | 2196 | 89.09 | 1588 | 608 |
| 90402 |  | 3.157 | 2471 | 2079 | 84.14 | 1521 | 558 |
| avg. |  | 3.155 | 2469 | 2151 | 87.12 | 1566 ± 39 | 585 ± 25 |
| 90403 | "10/90" | 3.154 | 2468 | 2221 | 89.99 | 1595 | 626 |
| 90404 | Li | 3.165 | 2477 | 2197 | 88.70 | 1595 | 602 |
| 90405 |  | 3.148 | 2464 | 2204 | 89.45 | 1596 | 608 |
| avg. |  | 3.156 | 2470 | 2207 | 89.35 | 1595 ± 1 | 612 ± 12 |
| 90406 | "50/50" | 3.157 | 2471 | 2206 | 89.28 | 1861 | 345 |
| 90407 | Li | 3.152 | 2467 | 2233 | 90.51 | 1862 | 371 |
| 90408 |  | 3.157 | 2471 | 2207 | 89.32 | 1863 | 344 |
| avg. |  | 3.155 | 2469 | 2216 | 89.75 | 1862 ± 1 | 353 ± 15 |

It is therefore apparent that the present invention accomplishes its intended objects. There is provided an electrochemical cell that makes use of unbalanced electrode components comprising one of the cell electrodes, i.e. either the anode or the cathode, to provide for an end-of-life or contact state-of-discharge indication.

It is intended that the foregoing description of the preferred embodiments of the present invention be only representative and that the present invention be only limited by the hereinafter appended claims.

What is claimed is:

1. An electrochemical cell comprising:

a) a casing means of electrically conductive material;

b) a first electrode means provided as a first continuous sheet comprising a first electrode active material;

c) a second electrode means including a second electrode active material, wherein the second electrode means is provided as a second continuous sheet comprising at least two second electrode portions, each second electrode portion having a different thickness and a combined surface area substantially similar to and facing the first electrode means such that the first electrode means and the second electrode means are electrically associated with respect to each other in a jellyroll configuration; and d) an electrolyte operatively associated with the first and the second electrode means to generate an output voltage in an external electrical circuit connected to the cell during an electrochemical reaction, wherein the one second electrode component having the lesser thickness is rendered electrochemically unreactive prior to the other second electrode component having the greater thickness to produce a step change in the output voltage from a higher output voltage to a lower output voltage.

2. The electrochemical cell of claim 1 wherein the first electrode means serves as an anode means and the second electrode means serves as a cathode means.

3. The electrochemical cell of claim 1 wherein the first electrode means serves as a cathode means and the second electrode means serves as an anode means.

4. The electrochemical cell of claim 1 wherein the second electrode means serves as a cathode means and the second electrode active material is selected from the group consisting of manganese dioxide, fluorinated carbon, carbon, silver vanadium oxide, copper silver vanadium oxide, titanium disulfide, copper oxide, copper sulfide, iron sulfide, vanadium oxide, copper vanadium oxide and iron disulfide, and combinations thereof.

5. The electrochemical cell of claim 1 wherein the first electrode means serves as an anode means and the first electrode active material is selected from the group consisting of lithium, sodium, potassium, calcium, magnesium, their alloys and intermetallic compounds, and combinations thereof.

6. The electrochemical cell of claim 4 wherein the cathode means further includes a binder material and a conductive additive.

7. The electrochemical cell of claim 6 wherein the binder material is a fluoro-resin or polymeric material and the conductive additive includes graphite powder and/or carbon black powder.

8. The electrochemical cell of claim 1 further including a separator provided between the second electrode portions comprising the second electrode means and the first electrode means.

9. An electrochemical cell comprising:
   a) an anode means provided as a first continuous sheet comprising lithium;
   b) a cathode means comprising cathode active material, wherein the cathode means is provided as a second continuous sheet having at least two cathode portions, each cathode portion having a different thickness and a combined surface area substantially similar to and facing the lithium anode means and wherein the anode means and the cathode means are operatively associated with respect to each other in a jellyroll configuration; and
   c) an electrolyte operatively associated with the anode means and the cathode means to generate an output voltage in an external electrical circuit connected to the cell during an electrochemical reaction, wherein the cathode portion having the lesser thickness is rendered electrochemically unreactive prior to the other cathode portion having the greater thickness to produce a step change in the output voltage from a higher output voltage to a lower output voltage.

10. The electrochemical cell of claim 9 wherein the cathode active material is selected from the group consisting of manganese dioxide, carbon, fluorinated carbon, silver vanadium oxide, copper silver vanadium oxide, titanium disulfide, copper oxide, copper sulfide, iron sulfide and iron disulfide, and mixtures thereof.

11. The electrochemical cell of claim 9 further including a separator provided between the cathode portions comprising the cathode means and the anode means.

12. An electrochemical cell comprising:
   a) first electrode means comprising a first electrode active material and having at least a first and a second major surfaces of dissimilar surface areas prior to cell discharge;
   b) a second electrode means comprising a second electrode active material, wherein the second electrode means has at least two second electrode portions, each second electrode portion having a substantially similar thickness and having dissimilar surface areas facing a similarly sized surface area of a respective one of the first and second major surfaces of the first electrode means prior to cell discharge; and
   c) an electrolyte operatively associated with the first and second electrode means to generate an output voltage in an external electrical circuit connected to the cell during an electrochemical reaction, wherein the one second electrode portion having the lesser surface area is rendered electrochemically unreactive prior to the other second electrode portion having the greater surface area to produce a step change in the output voltage from a higher output voltage to a lower output voltage.

13. The electrochemical cell of claim 12 wherein the at least two second electrode portions are spaced apart.

14. The electrochemical cell of claim 12 wherein the first electrode means serves as an anode means and the second electrode means serves as a cathode means.

15. The electrochemical cell of claim 12 wherein the first electrode means serves as a cathode means and the second electrode means serves as an anode means.

16. The electrochemical cell of claim 12 wherein the second electrode means serves as a cathode means and the second electrode active material is selected from the group consisting of manganese dioxide, carbon, fluorinated carbon, silver vanadium oxide, copper silver vanadium oxide, titanium disulfide, copper oxide, copper sulfide, iron sulfide and iron disulfide, and mixtures thereof.

17. The electrochemical cell of claim 12 wherein the first electrode means serves as an anode means and the first electrode active material is selected from the group consisting of lithium, sodium, potassium, calcium, magnesium, their alloys and intermetallic compounds.

18. The electrochemical cell of claim 12 further including a separator provided between the two electrode portions comprising the second electrode means and the first and second major surfaces of the first electrode means.

19. An electrochemical cell comprising:
   a) a first electrode means comprising a first electrode active material, wherein the first electrode means has at least a first and a second major surfaces;
   b) a second electrode means comprising a second electrode active material, wherein the second electrode means has at least two second electrode portions, each second electrode portion including a known ratio of the second electrode active material mixed with non-electrode active material and positioned facing respective ones of the first and second major surfaces of the first electrode means, wherein one of the second electrode portions comprises a lesser ratio of the second electrode active material to the non-electrode active material than the other second electrode portion comprising the second electrode means; and
   c) an electrolyte operatively associated with the first and second electrode means to generate an output voltage in an external electrical circuit connected to the cell during an electrochemical reaction, wherein the one second electrode portion having the lesser ratio of the second electrode active material to the non-electrode active material is rendered electrochemically unreactive prior to the other second electrode portion having the greater ratio of the second electrode active material to the non-electrode active material resulting in a step change in the output voltage from a higher output voltage to a lower output voltage.

20. The electrochemical cell of claim 19 wherein the at least two second electrode portions are spaced apart.

21. The electrochemical cell of claim 19 wherein the first electrode means serves as an anode means and the second electrode means serves as a cathode means.

22. The electrochemical cell of claim 19 wherein the second electrode portions have similar surface areas as the first and second major surfaces of the first electrode means.

23. The electrochemical cell of claim 19 wherein the second electrode means serves as a cathode means and the second electrode active material is selected from the group consisting of manganese dioxide, carbon, fluorinated carbon, silver vanadium oxide, copper silver vanadium oxide, titanium disulfide, copper oxide, copper sulfide, iron sulfide and iron disulfide, and mixtures thereof.

24. The electrochemical cell of claim 19 wherein the first electrode means serves as an anode means and the first electrode active material is selected from the group consisting of lithium, a lithium alloy, sodium, potassium, calcium, magnesium, their alloys and intermetallic compounds.

25. The electrochemical cell of claim 19 further including a separator provided between the second electrode portions comprising the second electrode means and the first and second major surfaces of the first electrode means.

26. An electrochemical cell comprising:
   a) an anode means comprising an alkali metal and having at least a first and a second major surfaces;
   b) a cathode means operatively associated with the anode means and comprising cathode active material formed into at least two cathode portions, each cathode portion having a known ratio of the cathode active material mixed with non-cathode active material and positioned facing respective ones of the major surfaces of the anode means, wherein one of the cathode portions comprises a lesser ratio of the cathode active material to the non-cathode active material than the other cathode portion having a greater ratio of the cathode active material to the non-cathode active material; and
   c) an electrolyte operatively associated with the anode means and the cathode means to generate an output voltage in an external electrical circuit connected to the cell during an electrochemical reaction, wherein the one cathode portion having the lesser ratio of cathode active material to the non-cathode active material is rendered electrochemically unreactive by saturating intercalation of the anode active material prior to the other of the cathode portions having the greater ratio of the cathode active material to the non-cathode active material resulting in a proportionate reduction in the interelectrode working capacity by a factor related to the total quantity of the cathode active material comprising the cathode means contributed by the one cathode portion having the lesser ratio.

27. The electrochemical cell of claim 26 wherein the at least two cathode portions are spaced apart.

28. The electrochemical cell of claim 26 wherein the cathode portions each have similar surface areas as the first and second major surfaces of the anode means.

29. The electrochemical cell of claim 26 wherein the cathode active material is selected from the group consisting of manganese dioxide, carbon, fluorinated carbon, silver vanadium oxide, copper silver vanadium oxide, titanium disulfide, copper oxide, copper sulfide, iron sulfide and iron disulfide, and mixtures thereof.

30. The electrochemical cell of claim 26 wherein the alkali metal comprising the anode means is selected from the group consisting of lithium, a lithium alloy, sodium, potassium, calcium, magnesium, their alloys and intermetallic compounds.

31. The electrochemical cell of claim 26 further including a separator provided between the cathode components comprising the cathode means and the first and second major surfaces of the anode means.

32. An electrochemical cell comprising:
   a) a lithium anode having at least a first and second major surfaces;
   b) a cathode means operatively associated with the anode and consisting of cathode active material formed into at least two cathode portions, each having a known ratio of the cathode active material mixed with non-cathode active material and positioned facing respective ones of the major surfaces of the lithium anode, wherein one of the cathode portions comprises a lesser ratio of the cathode active material than the other cathode portion having a greater ratio of the cathode active material to the non-cathode active material; and
   c) an electrolyte operatively associated with the anode and the cathode means to generate an output voltage in an external electrical circuit connected to the cell during an electrochemical reaction, wherein the one cathode portion having the lesser ratio of cathode active material to the non-cathode active material is rendered electrochemically unreactive by saturating intercalation of the anode active material prior to the other cathode portion having the greater ratio of the cathode active material to the non-cathode active material resulting in a proportionate reduction in the interelectrode working capacity by a factor related to the total quantity of the cathode active material comprising the cathode means contributed by the cathode portion having the lesser percentage.

33. The electrochemical cell of claim 32 wherein the at least two cathode portions are spaced apart.

34. The electrochemical cell of claim 32 wherein the cathode portions have similar surface areas as the first and second major surfaces of the lithium anode.

35. The electrochemical cell of claim 32 wherein the cathode active material is selected from the group consisting of manganese dioxide, carbon, fluorinated carbon, silver vanadium oxide, copper silver vanadium oxide, titanium disulfide, copper oxide, copper sulfide, iron sulfide and iron disulfide, and mixtures thereof.

36. The electrochemical cell of claim 32 further including a separator provided between the cathode portions comprising the cathode means and the first and second major surfaces of the lithium anode.

37. A secondary electrochemical cell comprising:
   a) a cathode means capable of intercalating and deintercalating an alkali metal;
   b) an anode means comprising at least two anode portions, each anode portion capable of intercalating and deintercalating the alkali metal, wherein the two anode portions are positioned facing opposed portions of the cathode means with one of the anode portions having a lesser capacity to intercalate and deintercalate the alkali metal than the other anode portion having a greater capacity; and
   c) an electrolyte operatively associated with the cathode means and anode means to generate an output voltage in an external electrical circuit connected to the cell during an electrochemical reaction, wherein when the cell is in a charged condition and during electrical discharge, the one anode portion having the lesser capacity is rendered electrochemically unreactive by deintercalation of alkali metal ions moving through the electrolyte to the cathode means prior to the other anode portion having the greater capacity resulting in a step change in the output voltage from a higher output voltage to a lower output voltage and wherein the secondary electrochemical cell is rechargeable with the alkali metal ions intercalated into the cathode means being transferrable back to the anode means to reintercalate therein.

38. The secondary electrochemical cell of claim 37 wherein the at least two anode portions are spaced apart.

39. The secondary electrochemical cell of claim 37 wherein the cathode means is initially a lithiated material selected from the group consisting of lithiated nickel oxide, lithiated cobalt oxide, and lithiated mixed oxides of cobalt with nickel and tin.

40. The secondary electrochemical cell of claim 37 wherein the alkali metal is designated "Am" and the two anode portions comprising the anode means comprise a carbonaceous mixture having the general formula $Am_xC_6$ upon intercalation of the alkali metal ions therein.

41. The secondary electrochemical cell of claim 37 wherein the alkali metal is lithium.

42. The secondary electrochemical cell of claim 37 further including a separator provided between the at least two anode portions comprising the anode means and the cathode means.

43. The secondary electrochemical cell of claim 37 further including a casing means of electrically conductive material and a conductor means for providing electrical connection to the cathode means, wherein the anode portions comprising the anode means are electrically connected to the casing means and wherein the conductor means for providing electrical connection to the cathode means extends through the casing means and is electrically insulated therefrom.

44. The secondary electrochemical cell of claim 37 wherein the anode means further includes a conductive additive.

45. The secondary electrochemical cell of claim 44 wherein the conductive additive is carbon black powder.

* * * * *